United States Patent
Sakurai et al.

[11] Patent Number: 5,995,720
[45] Date of Patent: *Nov. 30, 1999

[54] INFORMATION PROCESSING APPARATUS, AN INFORMATION PROCESSING METHOD, AND A STORAGE MEDIUM

[75] Inventors: Toshio Sakurai, Tokyo; Minoru Nojiri, Zushi; Noboru Tamura, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/630,539

[22] Filed: Apr. 10, 1996

[30] Foreign Application Priority Data

Apr. 11, 1995 [JP] Japan ................................. 7-110188
Mar. 26, 1996 [JP] Japan ................................. 8-070063
Mar. 26, 1996 [JP] Japan ................................. 8-070068

[51] Int. Cl.⁶ ..................................................... G06F 15/00
[52] U.S. Cl. ............................ 395/114; 395/113; 395/112
[58] Field of Search ................................. 395/114, 112, 395/113, 101, 200.76, 200.37, 200.31, 106; 400/70, 76, 77; 358/407, 468, 434, 435, 436, 437, 438, 439; 709/201, 207, 246; 347/5; 399/1, 8; 710/48, 260, 261, 262, 263, 264, 266

[56] References Cited

U.S. PATENT DOCUMENTS

| 4,754,428 | 6/1988 | Schultz et al. | 395/200.76 |
| 5,381,549 | 1/1995 | Tamura | 395/700 |
| 5,559,932 | 9/1996 | Machida et al. | 395/114 |
| 5,559,933 | 9/1996 | Boswell | 395/114 |

*Primary Examiner*—Dov Popovici
*Attorney, Agent, or Firm*—Fitzpatrick, Cella, Harper & Scinto

[57] ABSTRACT

An information processing apparatus capable of printing printing information input from the outside of the apparatus using an incorporated printing device, an information processing method for such an apparatus, and a storage medium which stores control programs for such a method are provided. Also provided are an information processing apparatus which satisfies both a request to print printing information input from another information processing apparatus to an incorporated printing device and a request to print printing information formed by itself even if the two requests are simultaneously provided, an information processing method for such an apparatus, and storage medium which stores control programs for such a method.

39 Claims, 16 Drawing Sheets

FIG.9

```
WHAT IS CONNECTED
EXTERNAL APRARATUS ?

1. INPUT DEVICE

2. PRINTING INPUT (OTHER INFORMATION
   PROCESSING APPARATUS
   CONNECTED)

3. PRINTER OUTPUT
```

INFORMATION PROCESSING APPARATUS, AN INFORMATION PROCESSING METHOD, AND A STORAGE MEDIUM

BACKGROUND OF THE INVENTION

1. Field of the Invention

This invention relates to an information processing apparatus which incorporates a printing device, to an information processing method for such an apparatus, and to a storage medium which stores control programs for such an apparatus and method.

2. Description of the Related Art

Conventionally, an information processing apparatus is connected to an independent external printing device via an interface in order to print printing information which has been formed and edited, and printing is performed by outputting the printing information to the external printing device.

Recently, however, various kinds of word processors or the like have been anounced in which an information processing unit for forming and editing printing information and a printing device are incorporated within a case. Furthermore, very small information processing apparatuses, such as so-called notebook-size personal computers or the like, have also been announced in which a printing device is incorporated.

In such a conventional information processing apparatus incorporating a printing device, the incorporated printing device prints only printing information which has been formed and edited by the main body of the information processing apparatus, because the printing device is provided for that purpose. Accordingly, in order to input printing information from the outside of the apparatus and print the input printing information by the incorporated printing device, it is necessary to perform programming using the information processing apparatus as a printer server, and perform printing by connecting the information processing apparatus to another information processing apparatus via a network using an interface, such as RS-232C or LAN. Hence, it is difficult to construct an information processing system including a printing device at a low cost.

SUMMARY OF THE INVENTION

It is an object of the present invention to provide an information processing apparatus which can print printing information input from the outside of the apparatus using an incorporated printing device, to provide an information processing method for such an information processing apparatus, and to provide a storage medium for storing control programs used for such an apparatus and method.

It is another object of the present invention to provide an information processing apparatus which satisfies both a request to print printing information input from another information processing apparatus to an incorporated printing device, and a request to print printing information formed by the information processing apparatus even if the two requests are simultaneously provided, to provide an information processing method for such an apparatus, and to provide a storage medium which stores control programs for such an apparatus and method.

According to the above-described configuration, it is possible not only to determine input information and perform printing using the incorporated printer, but also to transfer data from an external information apparatus to a program of the information processing apparatus. Such information transferred to the program can include printing information transferred to printing means and information from a scanner or the like.

According to one aspect, the present invention which achieves these objectives relates to an information processing apparatus comprising generation means for generating printing information, printing means for printing the printing information generated by the generation means, output means for outputting the printing information generated by the generation means to the outside of the apparatus, input means for inputting printing information from the outside of the apparatus, detection means for detecting that the printing information has been input from the outside of the apparatus to the input means, and instruction means for prohibiting output of the printing information to the outside of the apparatus by the output means and for instructing transfer of the printing information input from the outside of the apparatus to the printing means.

According to another aspect, the present invention which achieves these objectives relates to an information processing method in an information processing apparatus comprising generation means for generating printing information and printing means for printing the printing information generated by the generation means, comprising the steps of determining whether or not printing information has been input from the outside of the information processing apparatus, interrupting processing in execution when it has been determined in the determining step that printing information has been input from the outside of the apparatus, and printing the input printing information by the printing means.

According to still another aspect, the present invention which achieves these objectives relates to a storage medium for storing control programs to be used in an information processing apparatus comprising generation means for generating printing information and printing means for printing the printing information generated by the generation means, comprising storage means for storing a control program for determining whether or not printing information has been input from the outside of the information processing apparatus, interrupting processing in execution when it has been determined that printing information has been input from the outside of the apparatus, and printing the input printing information by the printing means.

According to still another aspect, the present invention which achieves these objectives relates to an information processing apparatus comprising generation means for generating printing information, printing means for printing the printing information generated by the generation means, input means for inputting printing information from the outside of the information processing apparatus, and control means for transferring the printing information input from the input means to the printing means or for spooling the input printing information.

According to still another aspect, the present invention which achieves these objectives relates to an information processing method in an information processing apparatus comprising generation means for generating printing information and printing means for printing the printing information generated by the generation means, comprising the steps of inputting printing information from the outside of the information processing apparatus, and transferring the printing information input in the inputting step to the printing means or spooling the input printing information.

According to still another aspect, the present invention which achieves these objectives relates to a storage medium for storing control programs to be used in an information processing apparatus comprising generation means for generating printing information and printing means for printing the printing information generated by the generation means, comprising storage means for storing a control program for inputting printing information from the outside of the information processing apparatus, and for transferring the input printing information input to the printing means or spooling the input printing information.

The foregoing and other objects, advantages and features of the present invention will become more apparent from the following description of the preferred embodiments taken in conjunction with the accompanying drawings.

BRIEF DESCRIPTION OF THE DRAWINGS

FIG. 9 illustrates the contents displayed on a display device 101 shown in FIG. 2 in the third embodiment;

DESCRIPTION OF THE PREFERRED EMBODIMENTS

Preferred embodiments of the present invention will now be described in detail with reference to the drawings.

FIRST EMBODIMENT

Figure 1:
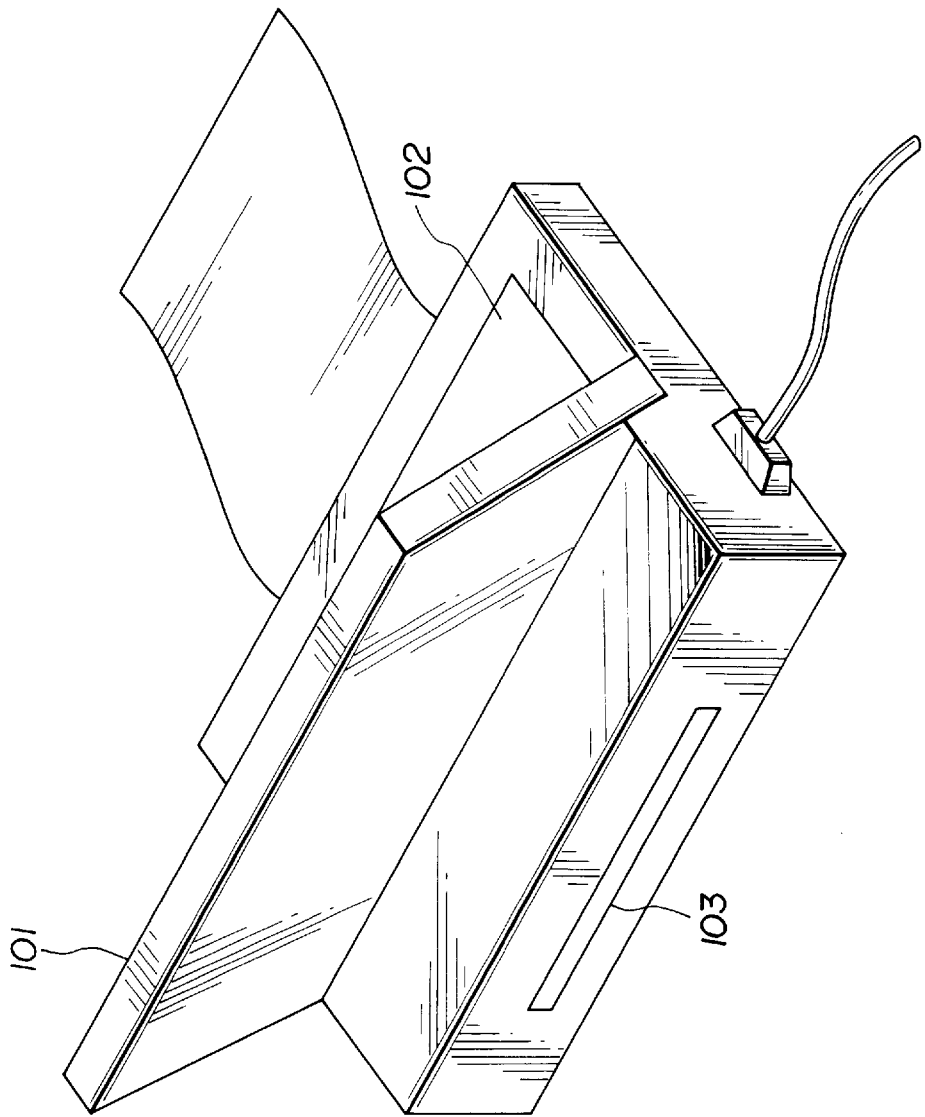
FIG. 1 is a perspective view illustrating an external appearance of an information processing apparatus commonly used in first through fifth embodiments of the present invention.

FIG. 1 is a perspective view illustrating an external appearance of an information processing apparatus commonly used in first through fifth embodiments of the present invention. This information processing apparatus is a so-called notebook-size personal computer, and comprises a cover including an LCD (liquid-crystal display) device 101, and a main body of the apparatus including a keyboard 102 and a printer 103.

Figure 2:
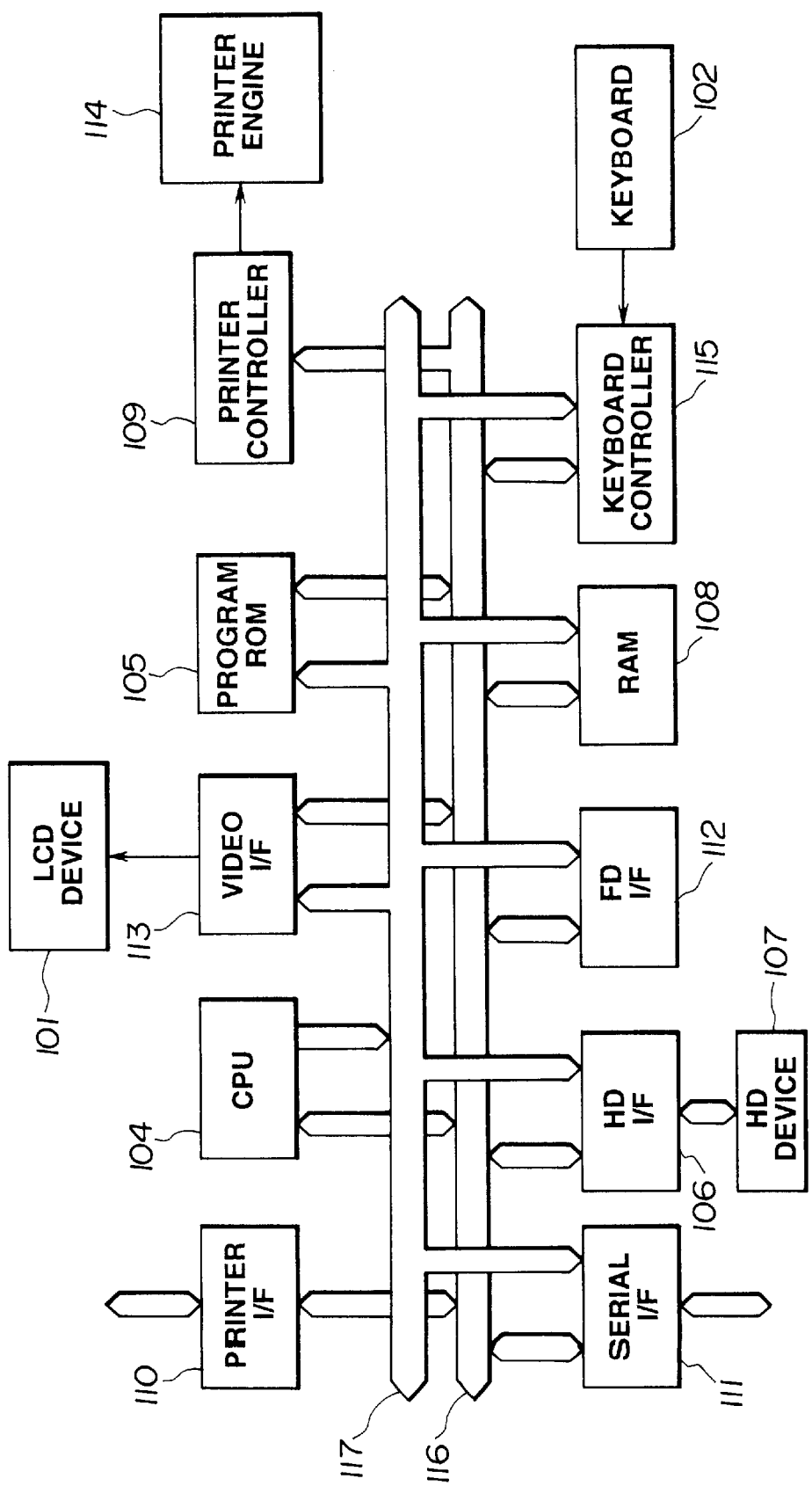
FIG. 2 is a schematic block diagram illustrating the configuration of the hardware of the apparatus shown in FIG. 1.

FIG. 2 is a schematic block diagram illustrating the configuration of the hardware of the information processing apparatus. The information processing apparatus comprises a CPU 104, a program ROM (read-only memory) 105, an HD (hard disk) I/F 106, an HD device 107, a RAM (random access memory) 108, a printer controller 109, a printer I/F 110, a serial I/F 111, an FD (floppy disk) I/F 112, a video I/F 113, and a keyboard controller 115. These units are connected to one another via a data bus 116, and via an address bus 117 when it is necessary.

The LCD device 101, a printer engine 114 and the keyboard 102 are connected to the video I/F 113, the printer controller 109 and the keyboard controller 115, respectively.

The CPU 104 controls the respective units of the information processing apparatus. The program ROM 105 stores programs for various kinds of controls, such as an initialization program and the like, to be executed by the CPU 104. The HD I/F 106 reads various kinds of information stored in the HD device 107 in accordance with instructions from the CPU 104. The HD device 107 stores various kinds of information, such as system programs to be executed by the CPU 104, and control programs indicated by the flowcharts shown in FIGS. 3, 7, 8, 10, 11 and 12. The HD device 107 also temporarily stores printing information and printing control information.

The RAM 108 temporarily stores the above-described system programs and control programs read from the HD device 107 when the CPU 104 executes control, and also functions as printing-information developing areas when transferring printing information from the CPU 104 to the printer controller 109. The printer controller 109 controls a printing operation executed by the printer engine 114. The printer I/F 110 has a function of outputting printing information and the like formed by the information processing apparatus to the outside of the apparatus, and includes an input circuit for inputting printing information from the outside of the apparatus.

The serial I/F 111 is an interface, such as "RS-232C", "RS-422" or the like, for serially inputting/outputting parallel computer signals. The FD I/F 112 interfaces transmission/reception of information with floppy disks (not shown). The video I/F 113 outputs image data for display, and the like to the LCD device 101. The keyboard controller 115 performs control for inputting various kinds of operational information from the keyboard 102.

Next, the operation of the information processing apparatus will be described. First, when a reset has been input to the information processing apparatus, for example, by turning on the power supply of the apparatus, the CPU 104 reads an initialization program from the program ROM 105, and performs, for example, an instruction for the HD I/F 106 to read system programs stored in the HD device 107 or the above-described control programs in accordance with the initialization program.

The system programs and the control programs read from the HD device 107 are stored in the RAM 108. The CPU 104 executes the system programs stored in the RAM 108 to start an operation system.

When a printing command has been input to the information processing apparatus in the state of start of the operation system, the CPU 104 develops printing data in the RAM 108, and transmits the developed data to the printer controller 109. The printer controller 109 transfers the transmitted printing data to the printer engine 114, which performs printing on printing paper.

Next, a description will be provided of the operation when performing printing by outputting printing data from the information processing apparatus to an external printing device.

The CPU 104 request the printer I/F 110 to confirm whether or not the external printing device (not shown) has completed prepartion for printing. If the result of the confirmation is affirmative, the printer I/F 110 requests the CPU 104 to transfer printing data. Upon reception of the tranfer request, the CPU 104 outputs the printing data to the external printing device via the printer I/F 110 in the form of printing codes. The external printing device executes printing based on the received printing codes.

Figure 3:
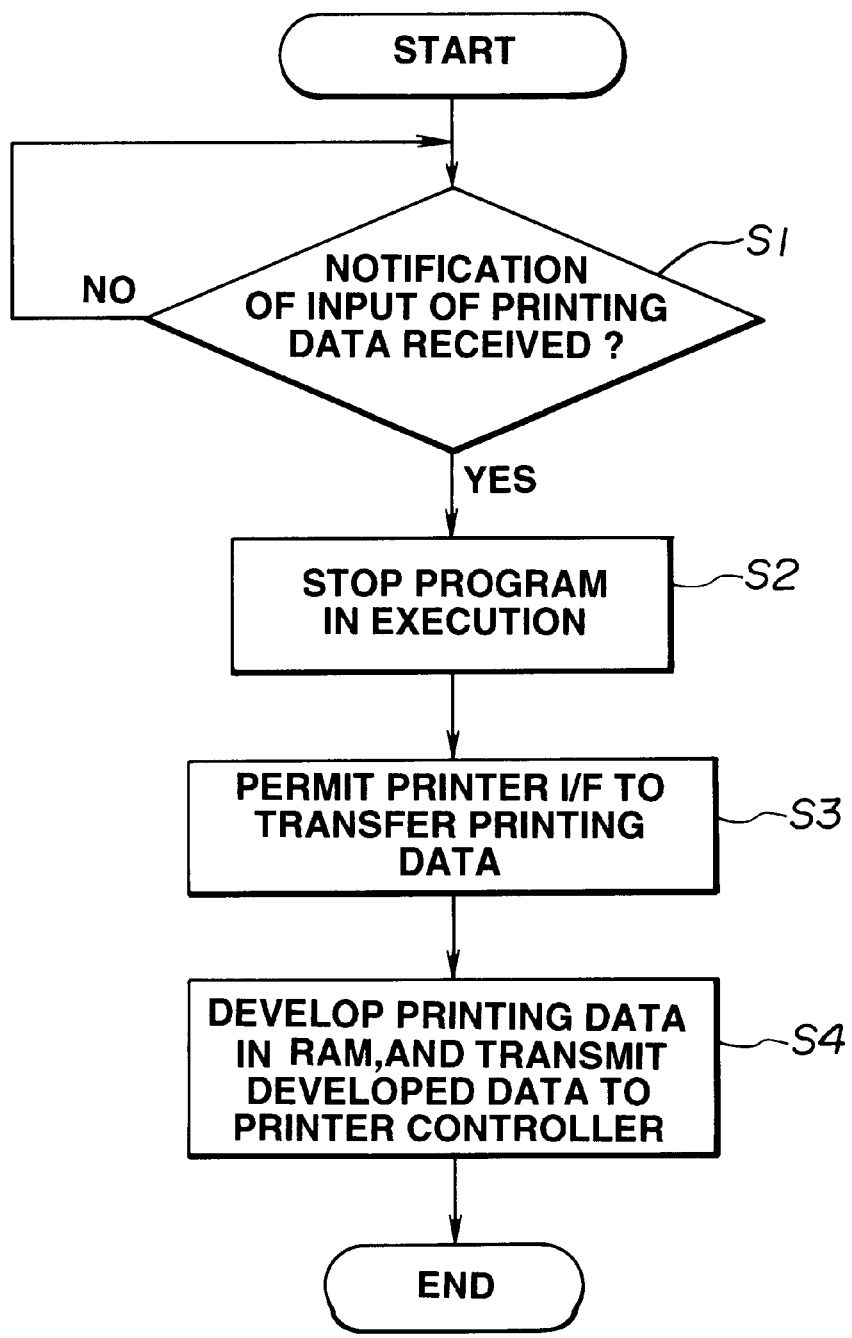
FIG. 3 is a flowchart illustrating control processing by a CPU (central processing unit) of the apparatus shown in FIG. 2.

Next, a description will be provided of a case of inputting printing data from the outside of the apparatus and performing printing using an incorporated printer, with reference to FIGS. 2 and 3.

The flowchart shown in FIG. 3 corresponds to a control program indicating the schematic operation of the CPU 104 when the information processing apparatus inputs printing data from another information processing apparatus or the like (not shown) and performs printing using the incorporated printer.

The other information processing apparatus is connected to the information processing apparatus via the printer I/F 110. Upon detection of input of printing data from the connected other information processing apparatus, the printer I/F 110 notifies the CPU 104 of prohibition of use of the printer I/F 110. The CPU 104 determines whether or not the notification from the printer I/F 110 has been received (step S1). If the result of the determination is affirmative, the CPU 104 temporarily stops the program in execution (step S2), and instructs the printer I/F 110 to permit transfer of the printing data (step S3). Upon reception of the permission of transfer of the printing data from the CPU 104, the printer I/F 110 transfers the printing data input from the other information processing apparatus. The CPU 104 develops the transferred printing data in the RAM 108, and sequentially transmits the developed data to the printer controller 109 (step S4). The printing data transmitted to the printer controller 109 is transmitted to the printer engine 103, which performs printing on paper.

Figure 4:
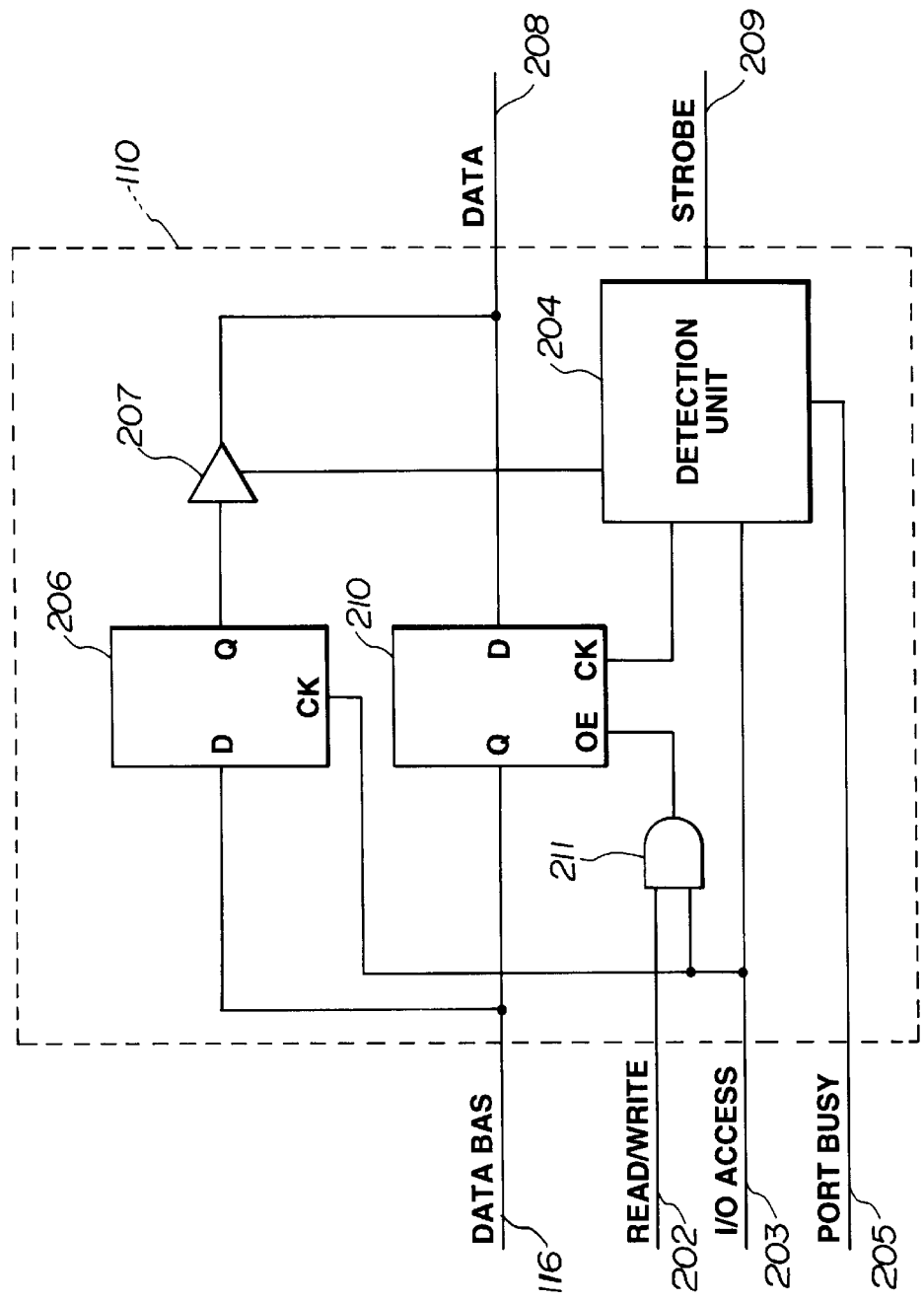
FIG. 4 is a schematic block diagram illustrating the configuration of a printer I/F (interface) of the apparatus shown in FIG. 2.

Next, a description will be provided of the operation of the printer I/F 110 when transferring printing data input from the outside of the apparatus to the CPU 104 with reference to FIG. 4. FIG. 4 is a block diagram illustrating the internal configuration of the printer I/F 110.

In FIG. 4, a data bus 116 is connected to a D terminal of an output data latch 206 and to a Q terminal of an input data latch 210. A READ/WRITE signal 202 output from the CPU 104 is input to an input terminal of a logical-product circuit 211. An I/O ACCESS signal 203 output from the CPU 104 is input to a detection unit 204, a CK terminal of the output data latch 206, and another input terminal of the logical-product circuit 211.

A Q terminal of the output data latch 206 is connected to the input side of an output buffer 207. The output side of the data output buffer 207 and a D terminal of the input data latch 210 are connected to an external data bus 208. The output side of the logical-product circuit 211 is connected to an output enable (OE) terminal of the input data latch 210.

The detection unit 204 detects the direction of transmission of the signal of the printer I/F 110. When a STROBE signal 209 is input from the external information processing apparatus to the detection unit 204, the detection unit 204 outputs a PORT BUSY signal 205 notifying the CPU 104 of the state of use of the printer I/F 110. The detection unit 204 is connected to a CK terminal of the input data latch 210 and to the control side of the data output buffer 207.

When outputting printing data to the outside of the apparatus via the printer I/F 110, the CPU 104 confirms that printing data is not input from the outside of the apparatus by checking the PORT BUSY signal 205 from the detection unit 204. Upon confirming that printing data is not input from the outside of the apparatus, the CPU 104 outputs printing data for output to the output data latch 206. When the CPU 104 outputs the I/O ACCESS signal 203, the output data latch 206 latches the printing data for output. The detection unit 204 makes the output buffer 207 "effective" while the printer I/F 110 outputs data, and the printing data is output via the external data bus 208.

Next, a description will be provided of the operation when the printer I/F 110 transfers printing data input from the outside of the apparatus to the data bus 116.

When a STROBE signal 209 has been input to the printer I/F from the outside of the apparatus, the detection unit 204 determines that printing data has been input from an external information processing apparatus, and makes the output buffer 207 in a high-impedance state, outputs a PORT BUSY signal 205 indicating input of printing data from the outside of the apparatus to the CPU 104, and outputs a latch pulse to the input data latch 210. Upon reception of the latch pulse, the input data latch 210 latches printing data input from the external data bus 208.

The CPU 104 transmits a READ/WRITE signal 202 and an I/O ACCESS signal 203, both having a value "true", to the printer I/F 110. These signals are transmitted to the logical-product circuit 211, which outputs an output enable (OE) signal to the input data latch 210, which transfers the latched signal to the CPU 104 via the data bus 116.

Then, the CPU 104 transmits the printing data to the printer engine 103 via the printer controller 109, and printing is performed.

As described above, according to the information processing apparatus of the first embodiment, another information processing apparatus is connected to the printer I/F 110. Upon detection of input of printing data from the connected other information processing apparatus, the printer I/F 110 stops otuput of printing data to the outside of the apparatus, transfers the input printing data to the printer controller 109 under the control of the CPU 104, and printing is performed by the incorporated printer. Hence, the information processing apparatus can print printing data input from the outside of the apparatus without relying on a network, and the information processing apparatus incorporating the printer can be effectively utilized as a printer.

Particularly when the information processing apparatus is a very small information processing apparatus, such as a notebook-size personal computer or the like, the information processing apparatus can be used as a portable printer operating with an incorporated battery, and therefore the use of the information processing apparatus can be widened.

SECOND EMBODIMENT

Figure 5:
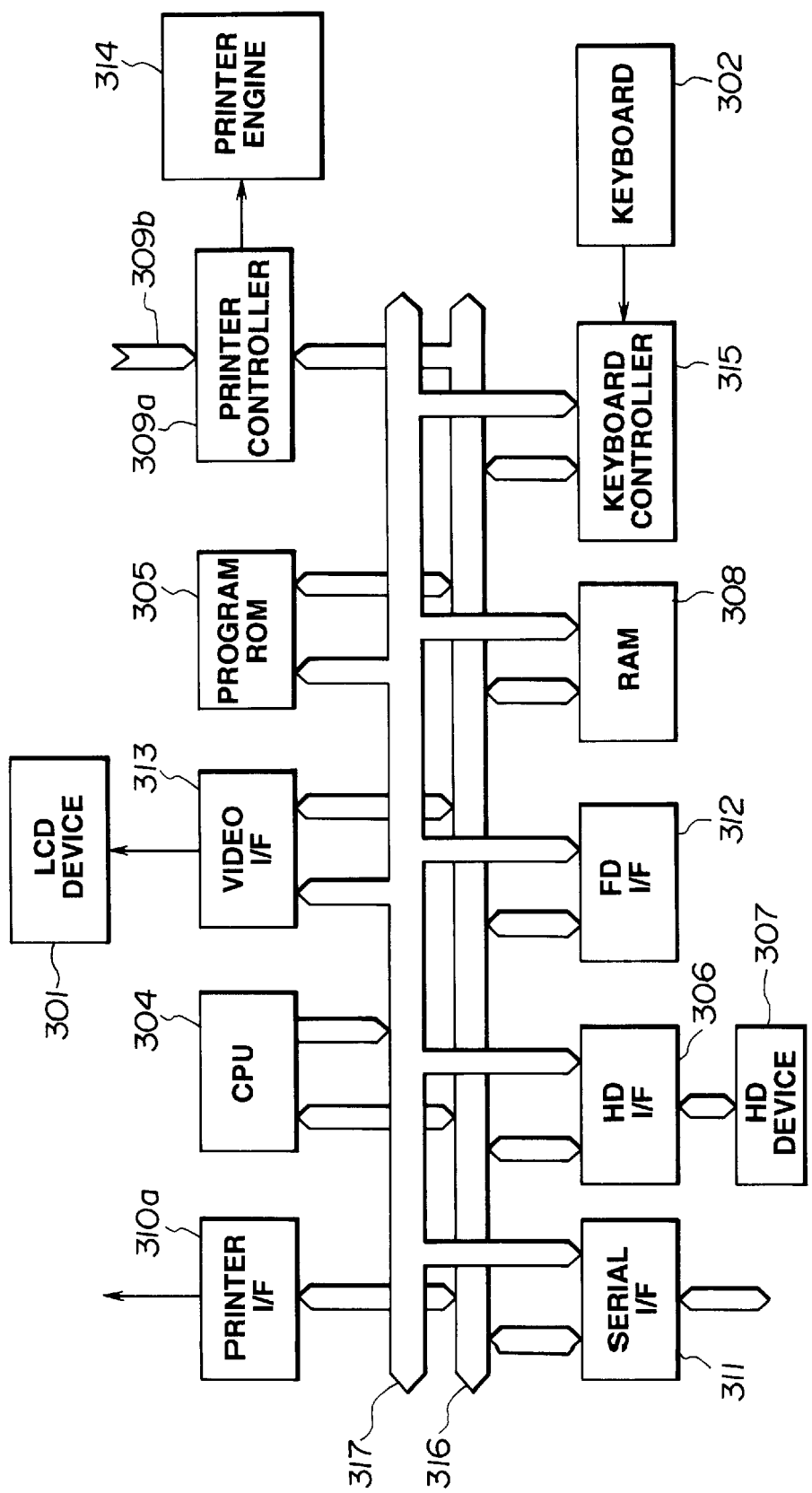
FIG. 5 is schematic block diagram illustrating the configuration of the hardware of an information processing apparatus according to a second embodiment of the present invention.

Next, a description will be provided of a second embodiment of the present invention with reference to FIG. 5. An information processing apparatus according to the second embodiment differs from that of the first embodiment in that while a printing-data input circuit is provided in the printer I/F 110 in the first embodiment, a printing-data input circuit (not shown) is provided in a printer controller 309a in the second embodiment. A printing-data input line 309b is connected to the printer controller 309a. A printer I/F 310a has only a function of transmitting printing data to an external printing device, and does not have a function of inputting printing data from the outside of the apparatus. Since other components are the same as in the first embodiment, a further description thereof will be omitted.

The printer controller 309a has a function of selecting one of printing data input from the outside of the apparatus and printing data transmitted from the CPU 304, and outputting the selected data to a printer engine 303. The printing data transmitted from the outside of the apparatus via the printing-data input line 309b is input to the printer controller 309a. When printing of the printing data transmitted from the CPU 304 is not performed by the printer engine 303, the printer controller 309a transmits the printing data from the outside of the apparatus to the printer engine 303, and printing is performed.

Also in the second embodiment, the same effects as in the first embodiment can be obtained. In contrast to the first embodiment, printer IF's are required for both input and output in the second embodiment. However, the second embodiment has the advantage that other processing than printing can be performed even while the CPU 304 processes printing data from the outside of the apparatus.

As described above, according to the first embodiment, an input circuit for inputting printing information from the outside of the apparatus is provided in the printer I/F 110 for outputting printing information to the outside of the apparatus, the printing information input from the outside of the apparatus can be printed by the incorporated printing device.

As described above, according to the first embodiment, when the detection unit 204 has detected that printing information has been input from the outside of the apparatus to the printer I/F 110, the printer I/F 110 is prohibited to output printing information to the outside of the apparatus and is instructed to transfer the printing information input from the outside of the apparatus to the printer engine 114 in response to the detection of the detection unit 204. Hence, the incorporated printing device can print the printing information input from the outside of the apparatus.

As described above, according to the second embodiment, since an input circuit for inputting printing information is provided in the printer controller 309a for controlling a printing operation by the printer engine 314, printing information input from the outside of the apparatus can be printed by the incorporated printing device, and other processing than printing can be performed by information processing means even while the printing information input from the outside of the apparatus is processed.

In the above-described first and second embodiments, however, since printing information input from another information processing apparratus and printing information output from an information processing apparatus cannot be simultaneously processed, one of requests of printing to the information processing apparatuses is, in some cases, kept awaited.

Furthermore, since one interface can be connected to an interface having an input/output function of only one apparatus at a certain time, a program cannot, in some cases, operate unless the apparatus to be accessed from the program is actually connected.

A description will now be provided of the operation of an information processing apparatus which satisfies both a request to print printing information input from another information processing apparatus to an incorporated printing device and a request to print printing information formed by the information processing apparatus even if the two requests are simultaneously provided.

THIRD EMBODIMENT

Figure 6:
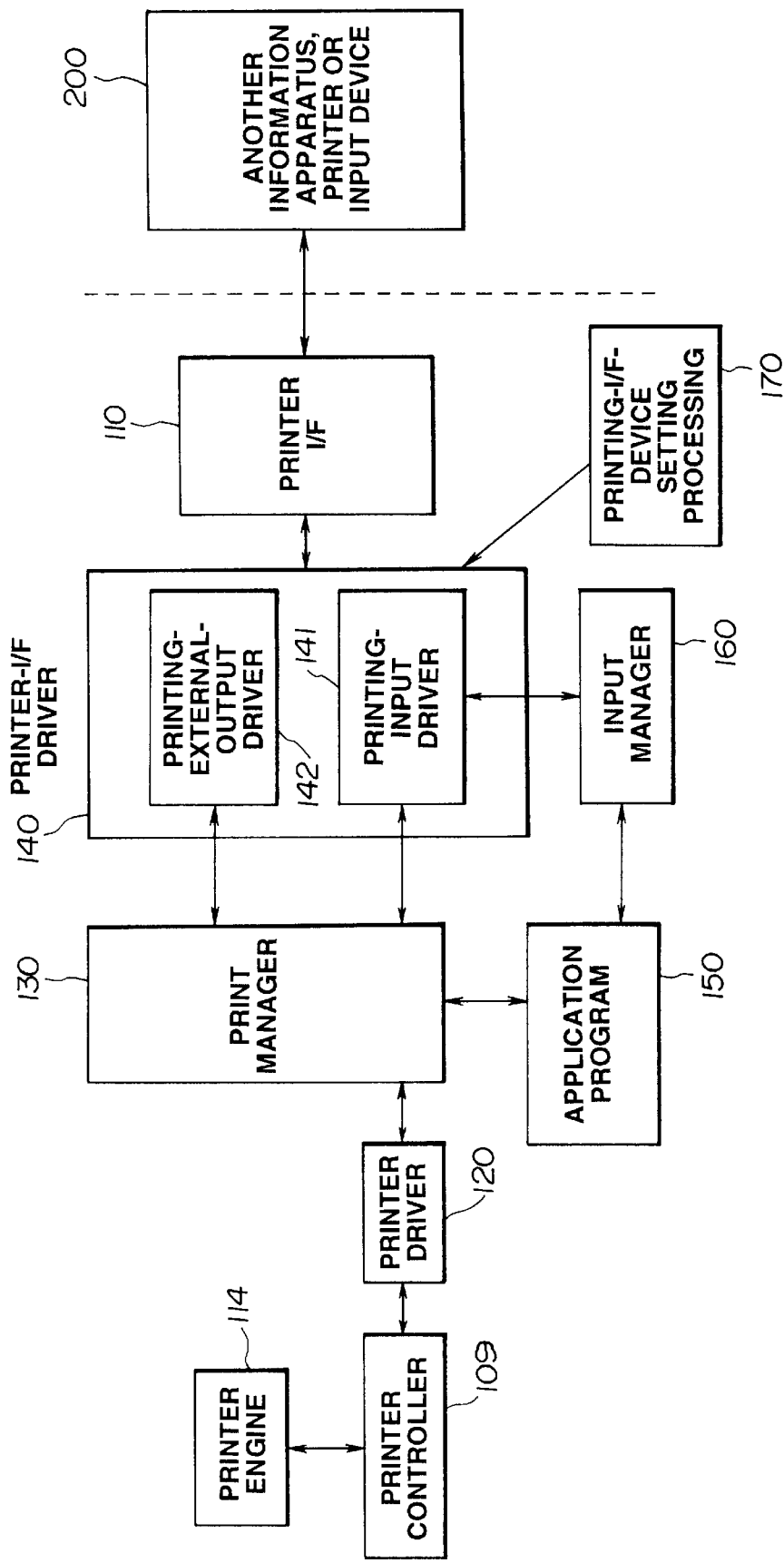
FIG. 6 is a block diagram illustrating a software system of an information processing apparatus according to a third embodiment of the present invention.

FIG. 6 is a block diagram illustrating the configuration of control programs according to a third embodiment of the present invention. These control programs are executed by the CPU 104 shown in FIG. 2. Since the block diagram of the hardware shown in FIG. 2 can be used for the following third through fifth embodiments of the present invention, a description thereof will be omitted.

A printer I/F 110, a printer controller 109 and a printer engine 114 are the same as those shown in FIG. 2. Another information apparatus, an external printer or an input device 200 is connected via the printer I/F 110. A print driver 120 is a program stored in the RAM 108 for acquiring printing information from a print manager 130 and transferring the acquired data to a printer controller 109.

A printer-I/F driver 140 is a program for controlling input/output of printing information and other data via the printer I/F 110. The printer-I/F driver 140 includes a printing-input driver 141, a printing-external-output driver 142, and processing of initializing the printer-I/F driver (omitted in FIG. 6, though the function will be described with reference to FIG. 7).

Although not illustrated, the printing-input driver 141 includes printer-I/F-input interrupt processing, a printing-input main driver, and printing-input-data processing (such processing will be described with reference to FIGS. 12, 10 and 11, respectively). Data obtained from the printer I/F 110 is dealt with as one unit, which is transferred to the print manager 130 or an input manager 160 in accordance with information set by printer-I/F-device setting processing 170.

Although not illustrated, the printing-external-output driver 142 includes printer-I/F-output interrupt processing, a printing-output main driver and printing-output-data processing (these three kinds of processing are omitted in FIG. 6, and a description thereof will be omitted because each processing is a known function or a funtion which can be easily analogized).

The print manager 130 controls printing information by programs stored in the RAM 108, and more specifically, performs the following three operations.

1. The print manager 130 stores printing information in the RAM 108 or the HD device 107 in accordance with an application program 150 stored in the RAM 108 or a request of printing from the printing-input driver 141.

2. The print manager 130 transmits printing information stored in the RAM 108 or the HD device 107 to the printer driver 120 or the printing-external-output driver 142 in accordance with the state of a request of printing output. The printer manager 130 is notified of which of the printing-input driver 141 and the printing-external-output driver 142 within the printer-I/F driver 140 is effective, according to printer-I/F-driver initialization processing within the printer-I/F driver 140 and printer-I/F-device setting processing shown in FIG. 8.

3. The print manager 130 can simultaneously have a plurality of units (jobs) of printing-output information and controls these units.

The application program 150 is a program, such as a word processor, a spread sheet or the like, stored in the RAM 108 and executed by the CPU 104.

The input manager 160 stores data transmitted from the printing-input driver 141 until a request of input/output of the application program is provided, and deals with such a request. More specifically, the input manager 160 performs the following three operations.

1. The input manager 160 spools input information in the RAM 108 or the HD device 107 in accordance with a request of output from the application program 150 stored in the RAM 108 or the printing-input driver 141.

2. The input manager 160 transmits the above-described stored input data to the application program in response to a request from the application program.

3. The input manager 160 can simultaneously have a plurality of units (jobs) of input information and controls these units.

The printer-I/F-device setting processing 170 sets a device connected to the printer I/F 110 in a user-interactive form.

A description will now be provided of a case of printing printing information within the information processing apparatus by the printer engine 114 with reference to FIGS. 6 and 2.

When a certain printing command is input to the information processing apparatus in a state in which the operation system operates, various kinds of control programs (the printing-input driver 141 and the print manager 130) of the third embodiment executed by the CPU 104, which acquires data from the printer I/F 110, repeats development of printing data in the RAM 108 and input/output of printing data and printing control information relative to the HD device 107, and transmits printing information to the printer controller 109 via the printer driver 120. The printer controller 109 transfers the transmitted printing data to the printer engine 114, which performs printing on printing paper.

Next, a description will be provided of the operation when performing printing by outputting printing data from the information processing apparatus to an external printing device using the print manager 130 executed by the CPU 104 in the RAM 108 and the printing-external-output driver 142.

When the print manager 130 determines that a request of printing output is to the external printer 200, it reads information for every logical unit (printing information and printing control information are stored as a file in the HD device 107 in units of job output), and transmits printing information to the printing-external-output driver 142 for every small unit.

The printing-external-output driver 142 requests the printer I/F 100 to confirm whether or not preparation for printing by the printer 200 has been completed. If the result of the confirmation is affirmative, the printer I/F 110 requests transfer of printing data. Upon reception of the request of transfer, the printing-external-output driver 142 outputs printing data to the external printing device via the printer I/F 110 by providing printing information transmitted from the print manager 130 in the form of printing codes. The external printing device executes printing based on the received printing codes.

Figure 7:
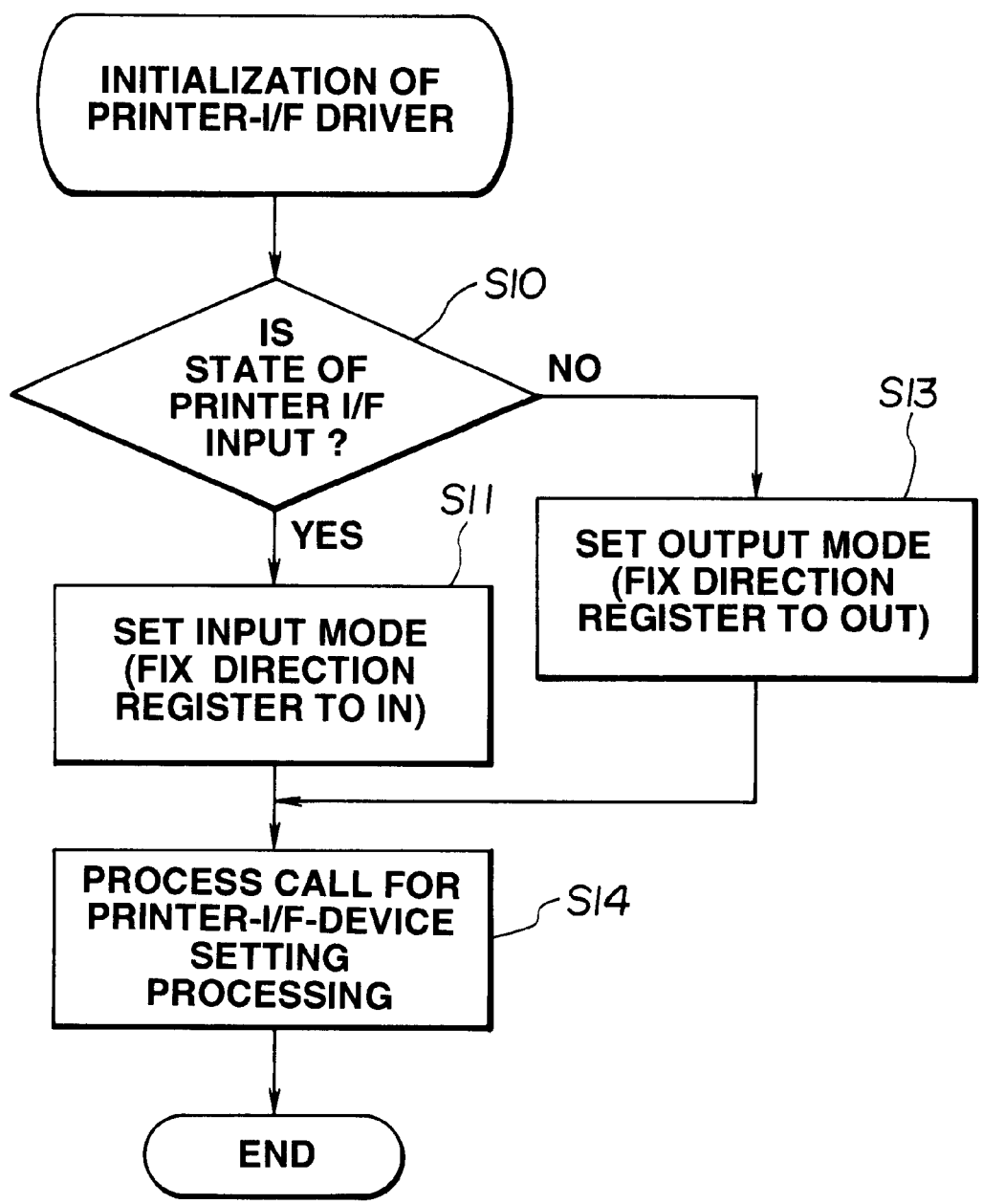
FIG. 7 is a flowchart illustrating processing of initializing a printer-I/F driver in the third embodiment.

FIG. 7 is a flowchart illustrating processing of initializing the printer-I/F driver 140. This processing is a function of the printer I/F driver 140 and is executed by the CPU 104. This processing is a program developed in the RAM 108 and serves as a part of the OS (operating system) of the information processing apparatus, and operates as initializing processing of printing started when the power supply of the apparatus is turned on or when the device is connected.

In step S10, the CPU 104 determines whether the state of the printer I/F 110 is input or output. The direction register of the printer I/F 110 indicates output when an external printer is mounted, and indicates input when an external information apparatus is mounted. If the result of the determination in step S10 indicates input, the CPU 104 executes step S11. If the result of the determination in step S10 indicates output, the process branches to step S13.

In step S11, the CPU 104 fixes the register to input. At that time, identifying data 'I' for printing input is stored in an identification area A, and the process proceeds to step S14.

In step S13, the CPU 104 fixes the register to output. At that time, identifying data 'P' for printing output is stored in the identification area A, and the process proceeds to step S14.

Figure 8:
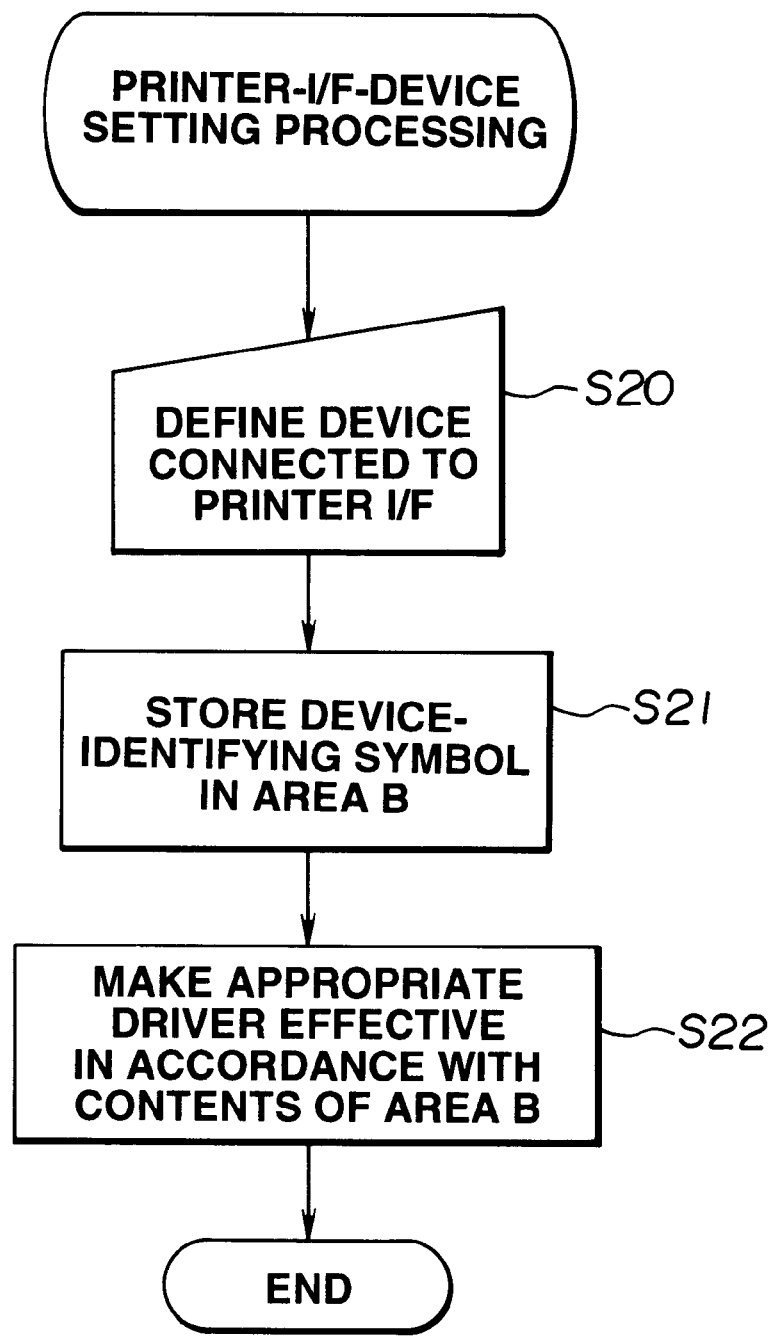
FIG. 8 is a flowchart illustrating printer-I/F-device setting processing in the third embodiment.

In step S14, the CPU 104 performs process call for printer-I/F-device setting processing shown in FIG. 8.

FIG. 8 is a flowchart illustrating printer-I/F-device setting processing 170. This processing is a program for urging the user to set the device connected to the printer I/F 110, and is executed by the CPU 104. This processing exists by itself, and the execution of the processing is instructed by a program or the user at any time. In step S20, the CPU 104 displays the contents of FIG. 9 on the display device 101, urges input of the user, and acquires input data from the keyboard 102. Consistency of this data with data (input or output) obtained from FIG. 7 is checked. If this data is inappropriate, another data is input. Input of data is executed until appropriate data is obtained.

In step S21, the CPU 104 stores the obtained data (item 1, 2 or 3 shown in FIG. 9) in an area B. In step S22, the CPU 104 makes an appropriate driver effective in accordance with the contents of the area B, and notifies the print manager of the effective driver. If the contents of the area B correspond to item 3, the printing-external-output driver is made effective. If the contents of the area B correspond to item 1 or 2, the printing-input driver is made effective.

Figure 12:
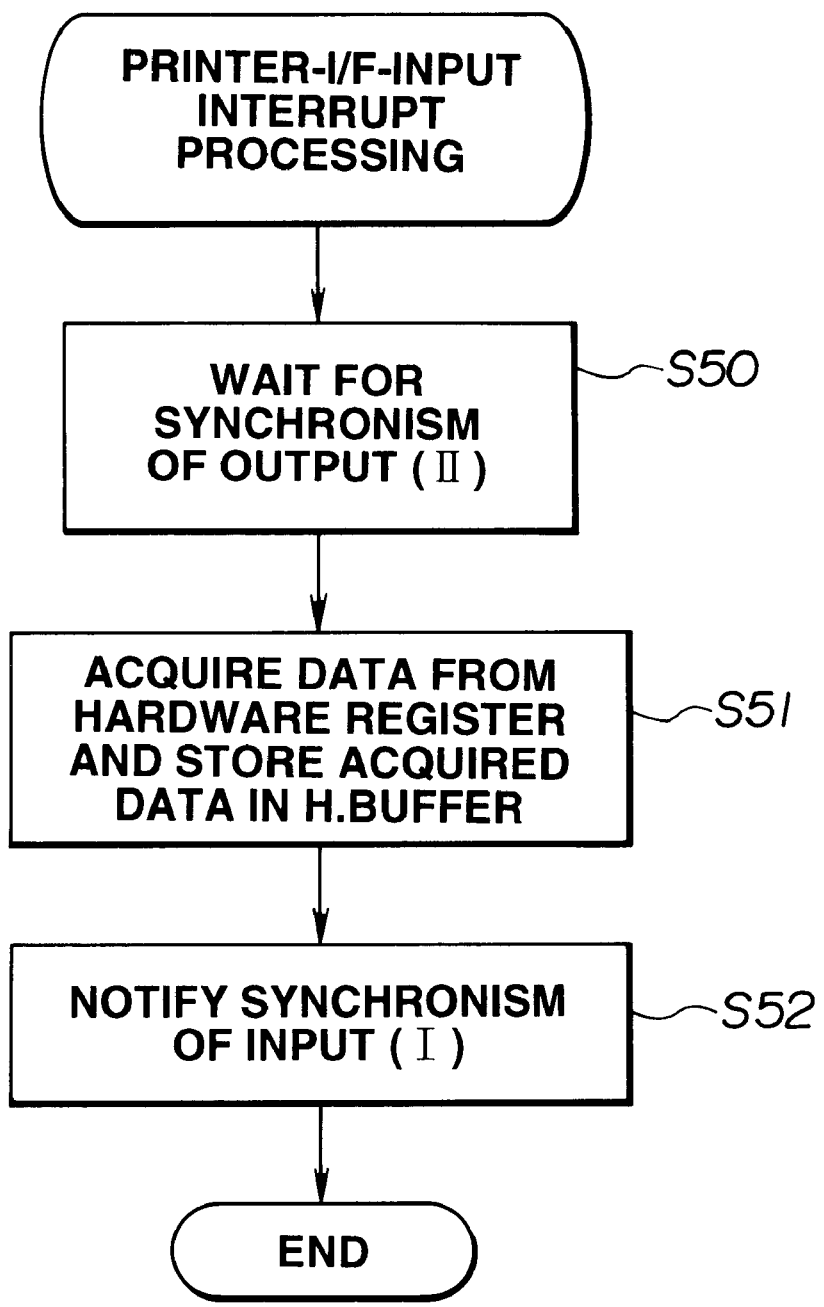
FIG. 12 is a flowchart illustrating printer-I/F-input interrupt processing in the third embodiment.

FIG. 12 is a flowchart illustrating printer-I/F input interrupt processing. This processing is a function of the printing-input driver 141, and is executed by the CPU 104. This processing is a program executed by the CPU 104 (interrupt processing) when printing information is input from the outside of the apparatus via the printer I/F 100.

In step S50, synchronism of output is awaited. This is processing of synchronism with step S31 shown in FIG. 10 (to be described later). In this step, it is determined if the following interrupt processing is to be started. Although not illustrated, this is general software synchronization processing, and is an OS function. When the process has passed through this step, the process cannot pass through this step unless the processing of step S41 has been again completed.

In step S51, the CPU 104 acquires data from the printer I/F 110, and stores the acquired data in a buffer of a working area of the RAM 108.

In step S52, synchronism of input is awaited. This is processing of synchronism with step S46 shown in FIG. 11 (to be described later) or step S30 shown in FIG. 10 (to be described later). This step notifies that processing of data acquired by interrupt processing can be started. The CPU 104 can thereby execute processing after the step S46 or S30. Although not illustrated, this is general software synchronization processing, and is an OS function.

Figure 10:
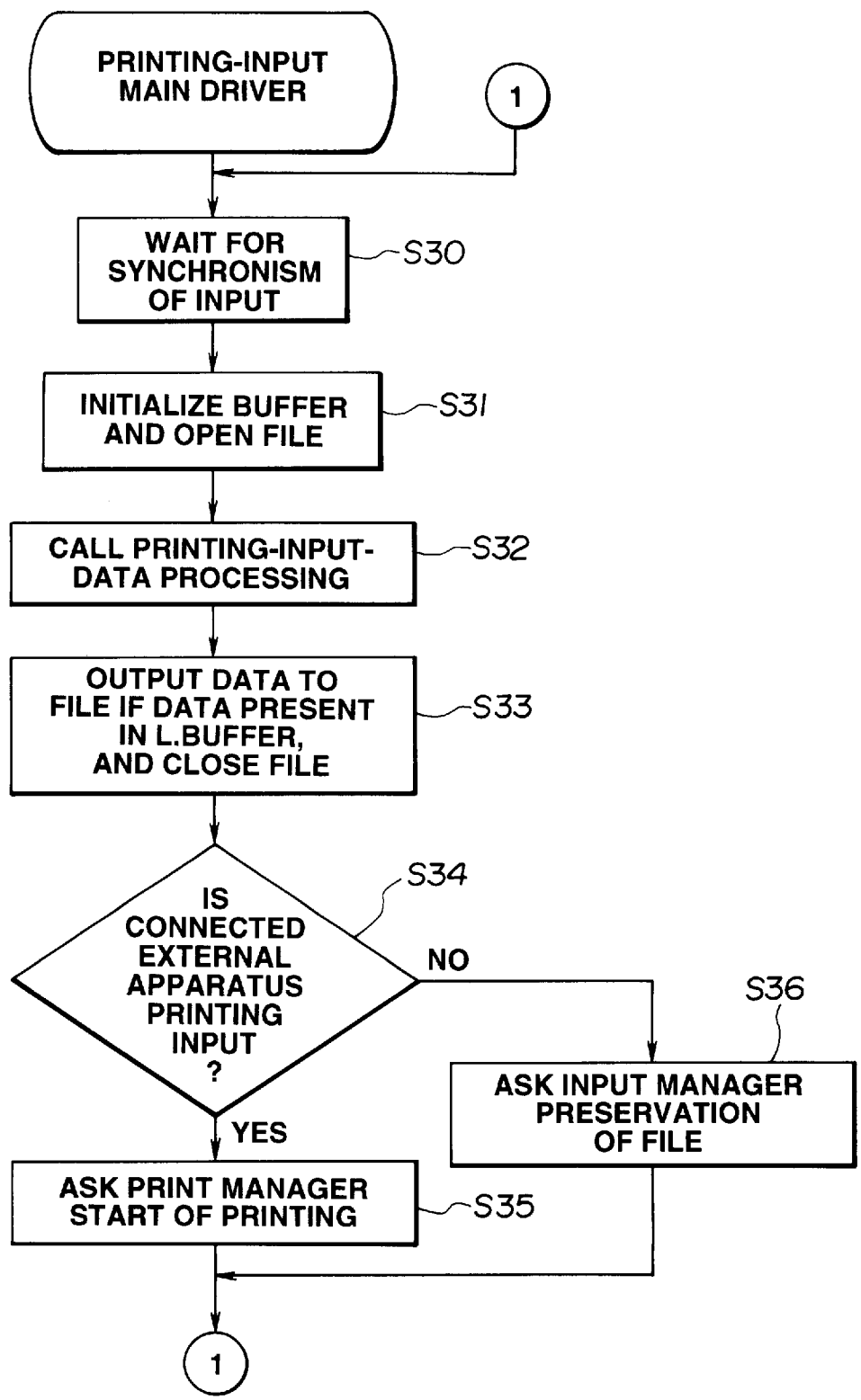
FIG. 10 is a flowchart illustrating printing-input main driver processing in the third embodiment.
Figure 11:
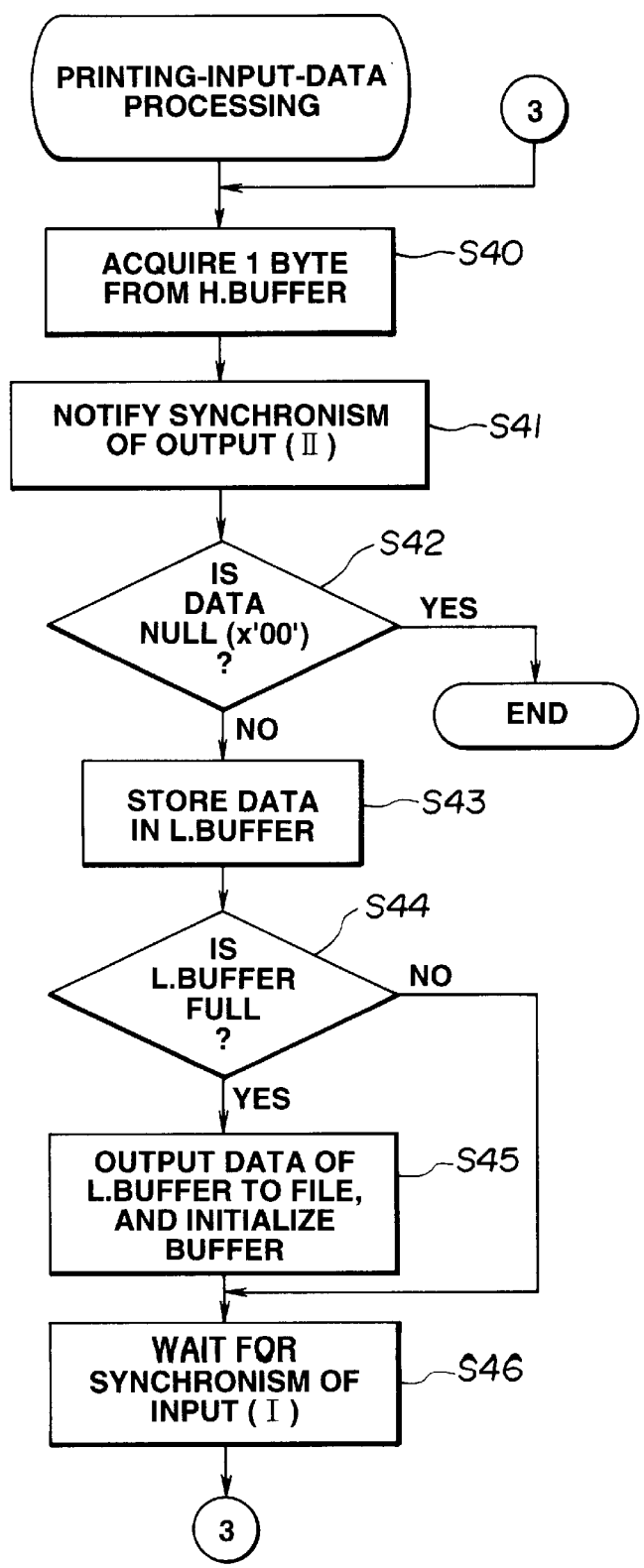
FIG. 11 is a flowchart illustrating printing-input-data processing in the third embodiment.

FIG. 11 is a flowchart illustrating printing-input-data processing, which is a function of the printing-input main driver 141. This processing is a subroutine of the printing-input main driver shown in FIG. 10, and is executed by the CPU 104.

In step S40, the CPU 104 takes input data from the printer I/F 110 stored in step S51 from a working area of the RAM 108.

In step S41, synchronism of output is notified to a waiting state of synchronism of output in step S50. It is thereby possible to continue the printer-I/F-input interrupt processing, and the process proceeds from step S50 to the next step.

In step S42, the CPU 104 determines if the data acquired in step S40 is data (x'00') indicating the end of the job. If the result of the determination in step S42 is affirmative, the process is terminated. If the result of the determination in step S42 is negative, the process proceeds to step S43.

In step S43, the CPU 104 stores the data acquired in step S40 in an L. buffer (256 bytes) for the printing-input driver. In step S44, the CPU 104 determines if the L. buffer is full (if stored data comprises 256 bytes). If the result of the determination in step S44 is negative, the process proceeds to step S46. If the result of the determination in step S44 is affirmative, the process proceeds to step S45.

In step S45, the CPU 104 outputs data stored in the L. buffer to a file, and initializes the buffer (sets a pointer for storage to zero).

In step S46, synchronism of input is awaited. When notification of synchronism of input of step S52 has been executed, the process returns from step S46 to step S40. When the process has passed through this step, the process cannot pass through this step unless the processing of step S52 has been again processed.

FIG. 10 is a flowchart illustrating the printing-input main driver. This processing is a function of the printing-input driver 141 controlled as a task for processing a unit of the OS, and is executed by the CPU 104.

In step S30, synchronism of input is awaited. If the processing of notification of step S52 is completed, the process passes through this step. When the process has passed through this step, the process cannot pass through this step unless the processing of step S52 has been again completed.

In step S31, the CPU 104 initializes the L. buffer (sets the pointer for storage to zero), and opens a file for input. In step S32, the CPU 104 calls the printing-input-data processing routine shown in FIG. 11. In step S33, the CPU 104 determines if the L. buffer is full (if stored data comprises 256 bytes). If the result of the determination is affirmative, data stored in the L. buffer is output to the file, and the file is closed.

In step S34, the CPU 104 determines whether or not printing data has been input based on data set by the printer-I/F-device setting processing 170. If the result of the determination in step S34 is affirmative, the process proceeds to step S35. If the result of the determination in step S34 is negative, the process proceeds to step S36.

In step S35, the CPU 104 asks the print manager 130 to start printing of the file for input, and the process returns to step S30. In step S36, the CPU 104 asks the input manager 160 to store (spool) the file for input, and the process returns to step S30.

Next, a description will be provided of the operation when performing printing by the incorporated printer by inputting printing data from the outside of the apparatus with reference to FIGS. 7, 8, 10, 11 and 12. FIGS. 7, 8, 10, 11 and 12 are flowcharts illustrating the operations of programs of the printing-external-output driver 142 and the printer-I/F-driver initialization processing operating in the RAM 108 by the CPU 104 when the information processing apparatus performs printing using the incoroprated printer by inputting printing data from another information processing apparatus or the like 200.

Another information processing apparatus (not shown) is connected to the information processing apparatus via the I/F 110. The printer I/F 110 has a function of a hardware for notifying the CPU 104 of the input state of the printer I/F 110 upon detection of input from the connected other information processing apparatus. The processes shown in FIGS. 7 and 12 are started by this function.

The printer-I/F-driver initialization processing shown in FIG. 7 is executed when the power supply of the information processing apparatus is turned on or when the other apparatus is connected. This processing detects whether the printer I/F 110 is in an input state or in an output state, and provides an appropriate state.

If the printer I/F 110 is set to an input state, the printer input driver 141 is made effective, the printer-I/F-device setting processing shown in FIG. 8 is started, and the user inputs the item 2. When data has been input from the other information processing apparatus connected to the printer I/F 110 is present in this state, the data input to the printer I/F 110 is output to the file according to the printer-I/F-input interrupt processing shown in FIG. 12, the printing-data processing shown in FIG. 10, and the printing-input main driver shown in FIG. 10. The data within the file is transmitted to the printer controller 109 by the print manager 130 and the printer driver 120. The printing data is transmitted to the printer engine 114 and is printed on paper.

Next, a description will be provided of the operation when storing (spooling) data in the input manager by inputting data from the outside of the apparatus with reference to FIGS. 7, 8, 10, 11 and 12. FIGS. 7, 8, 10, 11 and 12 are flowcharts illustrating the operations of programs of the printing-input driver 141 and the printer-I/F-driver initialization processing operating in the RAM 108 by the CPU 104 when the information processing apparatus inputs data from another information processing apparatus or the like 200 and stores the input data in the incorporated HD device 107.

Another information processing apparatus (not shown) is connected to the information processing apparatus via the printer I/F 110. The printer I/F 110 has a function of a hardware for notifying the CPU 104 of the input state of the printer I/F 110 upon detection of input from the connected other information processing apparatus. The processes shown in FIGS. 7 and 12 are started by this function.

The printer-I/F-driver initialization processing shown in FIG. 7 is executed when the power supply of the information processing apparatus is turned on. This processing detects whether the printer I/F 110 is in an input state or in an output state, and provides an appropriate state.

If the printer I/F 110 is set to an input state, the printing-input driver 141 is made effective, the printer I/F-device setting processing shown in FIG. 8 is started, and the user inputs the item 1.

When data has been input from the information processing apparatus connected to the printer I/F 110 in this state, the data input to the printer I/F 110 is output to the file according to the printer-I/F-input interrupt processing shown in FIG. 12, the printing-data processing shown in FIG. 11, and the printing-input main driver shown in FIG. 10. The data within the file is transmitted to the input manager 160 and is stored (spooled) in a file, and a request for input/output is awaited.

As described above, data taken in the information processing apparatus via the printer I/F 110 is transmitted to the printer engine 103 via the printer controller 109 as printing data and is printed, or the data is stored (spooled) in a file as input data and data input from the application program is awaited.

As described above, according to the information processing apparatus of the third embodiment, another information processing apparatus is connected to the printer I/F 110. Upon detection of input of the printing data from the connected other information processing apparatus, the printer I/F 110 stops otuput of printing data to the outside of the apparatus, transfers the input printing data to the printer controller 109 under the control of the CPU 104 according to the operations of the above-described various kinds of programs, and printing is performed by the incorporated printer. Hence, the information processing apparatus can print printing data input from the outside of the apparatus without relying on a network, and the information processing apparatus incorporating the printer can be effectively utilized as a printing device. Data from the outside of the apparatus is stored (spooled) in a file as input data, and processing from the application program (input or processing) is awaited.

Particularly when the information processing apparatus is a very small information processing apparatus, such as a notebook-size personal computer or the like, the information processing apparatus can be used as a portable printer operating with an incorporated battery, and therefore the use of the information processing apparatus can be widened.

FOURTH EMBODIMENT

Figure 13:
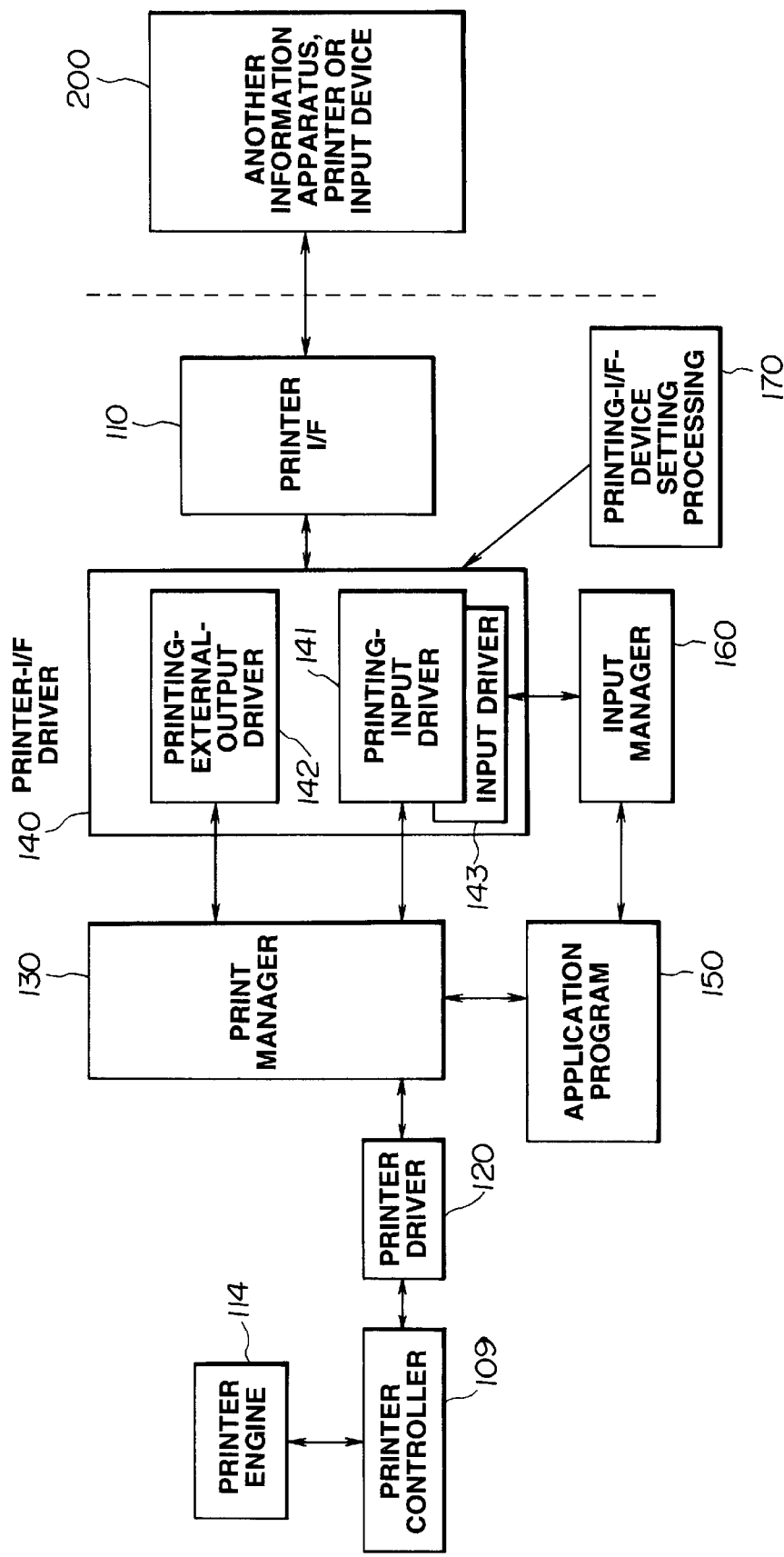
FIG. 13 is a block diagram illustrating a software system of an information processing apparatus according to a fourth embodiment of the present invention.

Next, a fourth embodiment of the present invention will be described with reference to FIG. 13. An information processing apparatus according to the fourth embodiment differs from the apparatus of the third embodiment in that while the printing-input driver 141 deals with data input from the outside of the apparatus by a single process (the printing-input driver) in the third embodiment, dedicated drivers (a printing-input driver 141 and an input driver 143) are provided in the fourth embodiment.

This is realized by adding after step S14 shown in FIG. 7 a processing step to start the input driver 143 if an input device is set.

The input driver shares the processes shown in FIGS. 11 and 12 with the printing-input main driver. For the input driver, the following modifications are performed, and the contents of the processing of step S22 shown in FIG. 8 are changed.

That is, steps S34 and S35 are removed from FIG. 10, and only steps S30, S31, S32, S33 and S36 are used for the input driver. At that time, only steps S30, S31, S32, S33 and S35 are used for the printing-input main driver.

Step S22 shown in FIG. 8 is modified as "the printing-external-output driver, the input driver and the printing-input driver are made effective if the contents of B indicate item 3, 1 and 2, respectively".

FIFTH EMBODIMENT

Figure 14:
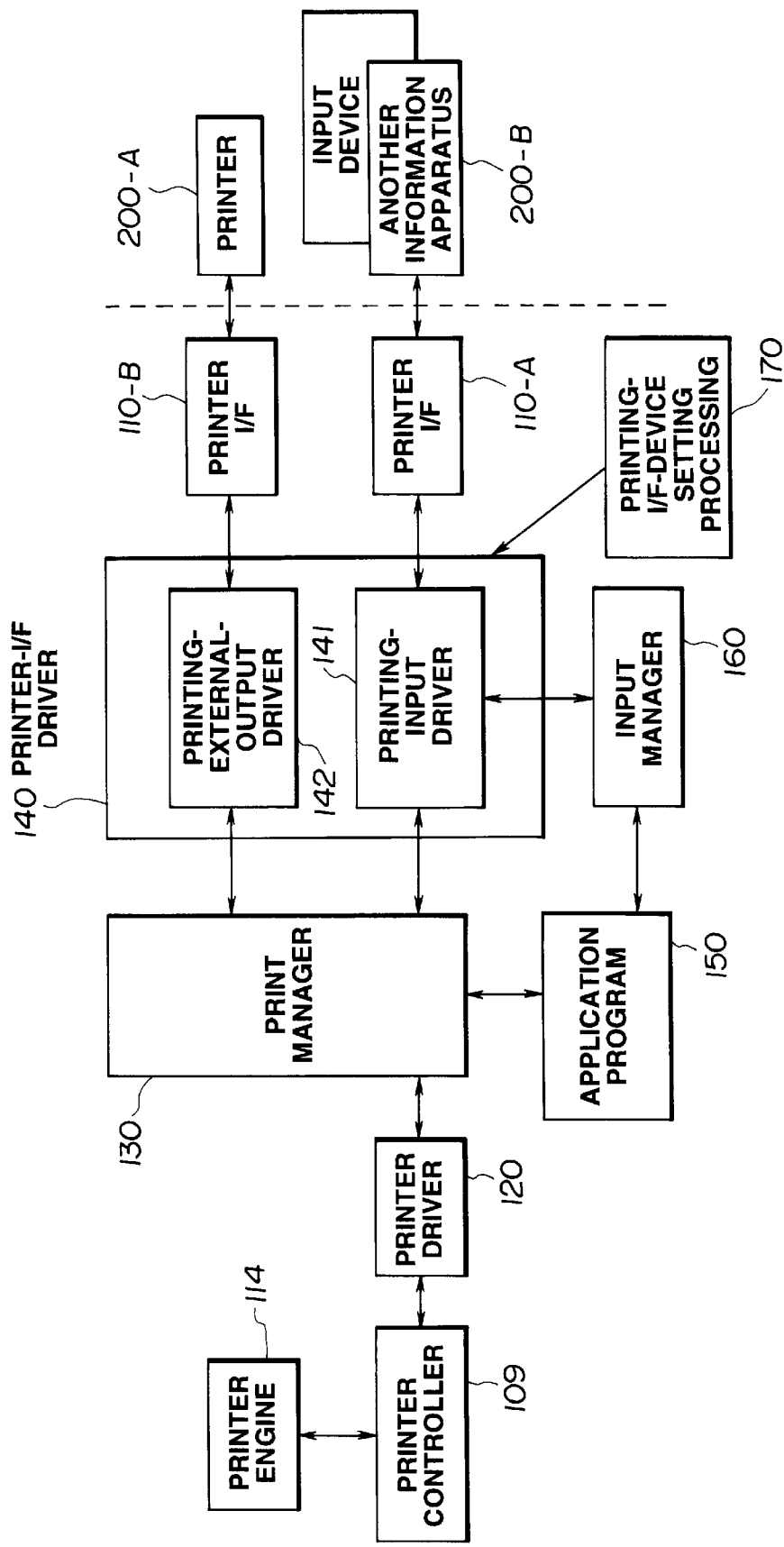
FIG. 14 is a block diagram illustrating a software system of an information processing apparatus according to a fifth embodiment of the present invention.

Next, a fifth embodiment of the present invention will be described with reference to FIG. 14. An information processing apparatus according to the fifth embodiment differs from the apparatus of the third embodiment in that while input/output means is provided in accordance with the operation of the printer I/F 110 in the third embodiment, a dedicated printer I/F 110-B is provided, and a dedicated printing-input driver and a dedicated input driver are allocated to the I/F 110-B. A printing-data input line is connected to the printer I/F 110-B. A printer I/F 110-A has only a function of transmitting printing data to an external printing device, and does not have a function of inputting printing data from the outside of the apparatus.

Other components in the third embodiment are modified as follows.

The initialization of the printer-I/F driver shown in FIG. 7 is divided into respective initialization processes for the printer I/F 110-A and the printer I/F 110-B.

Initialization dedicated for the printer I/F 110-A comprising only steps S11 and S14 shown in FIG. 7 is performed for the printer I/F 110-A.

Dedicated initialization processing of making the printer I/F 110-B and, unconditionally, the printing-external-output driver effective, which comprises only step S13 shown in FIG. 7, is performed for the printer I/F 110-B.

The item "3. printer output" shown in FIG. 9 is not displayed.

Step S20 shown in FIG. 8 comprises only check of input in accordance with FIG. 9. The printing-input driver is made effective.

The printer I/F 110-B has a function of outputting printing data input from the outside of the apparatus and printing data transmitted from the CPU 104 to the printer engine 114 via the printing-input driver 141, the print manager 130, the printing driver 120 and the printer controller 109 which have been described above.

Figure 15:
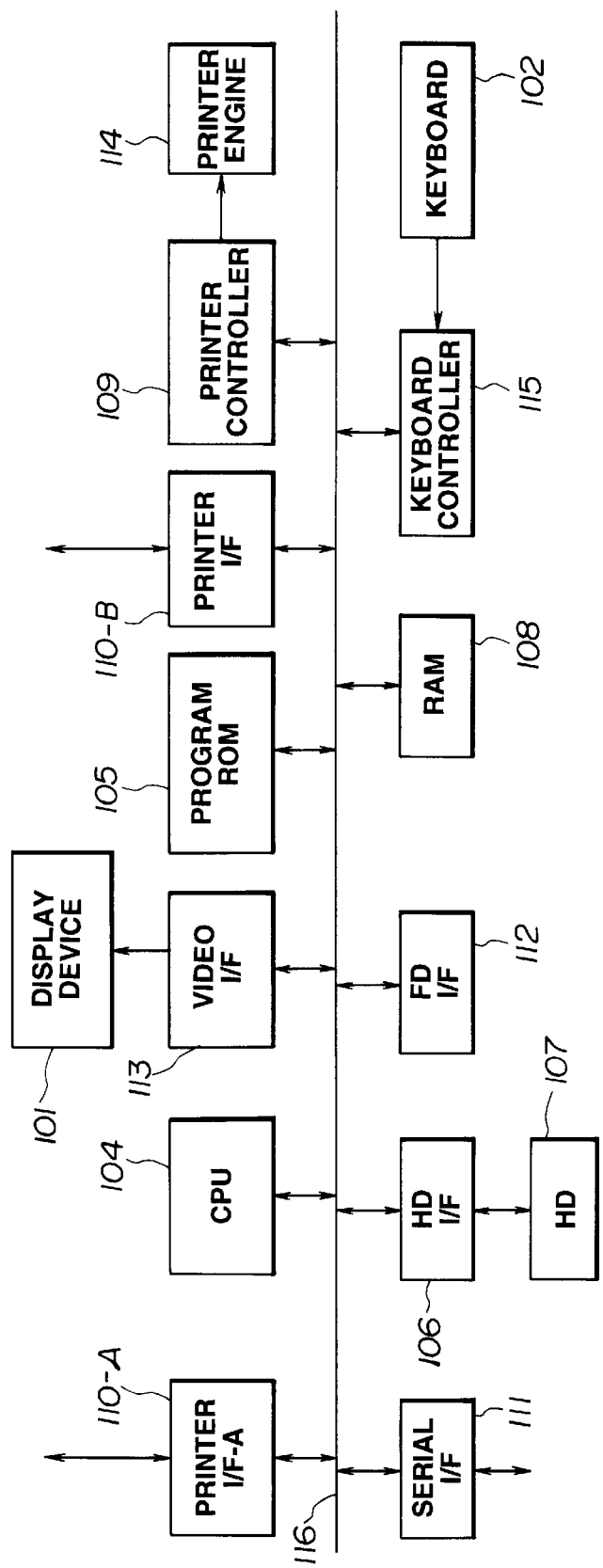
FIG. 15 is a block diagram illustrating the hardware of the information processing apparatus of the fifth embodiment.

FIG. 15 is obtained by removing the printer I/F 110 shown in FIG. 2, and adding the printer I/F 110-B dedicated for external output and the printer I/F 110-A dedicated for external input. Other components are the same as in FIG. 2.

The same effects as in the third embodiment can be obtained in the above-described fourth and fifth embodiment. In the fifth embodiment, in contrast to the third and fourth embodiments, a printer I/F is provided for each of input and output. Hence, printing output processing can be performed even while the CPU 104 processes printing data input from the outside of the apparatus.

As described above, according to the third through fifth embodiments, it is possible to receive printing information from an external information apparatus and to spool and print the received printing information while printing information generated by the information processing apparatus is printed. Furthermore, not only print information or input data from the outside of the apparatus can be printed, but also it can be made input data of an application program.

Furthermore, printing information from an external information apparatus can be received and printed during processing of printing printing information generated by another information processing apparatus while the information processing apparatus outputs data to the outside of the apparatus via the printer I/F.

In addition, it is possible to make logical input and output processing effective in accordance with the number of input/output devices, and to print input data from the outside of the apparatus or to process the data as input data.

The objects of the present invention are, of course, achieved by supplying a system or an apparatus with a storage medium which records program codes of software for realing the functions of the above-described embodiments, and storing and executing the program codes stored in the storage medium in the RAM 108 by a computer (or a CPU or an MPU (microprocessing unit)) of the system or the apparatus.

In this case, the program codes read from the storage medium realize the functions of the above-described embodiments, and the storage medium which stores the program codes constitutes the present invention.

For example, a floppy disk, a hard disk, an optical disk, a magnetooptical disk, a CD(compact disc)-ROM, a CD-R (compact disc-recordable), a magnetic tape, a nonvolatile memory card, a ROM or the like can be used as the storage medium for supplying the programs codes.

The functions of the above-described embodiments are, of course, realized by executing program codes read by a computer, and by performing at least a part of actual processing by an OS or the like which operates in the computer based on instructions of the program codes.

The functions of the above-described embodiments are, of course, realized by writing program codes read from a storage medium in a memory provided on a function-expanding board inserted in a computer or on a function-expanding unit connected to the computer, and performing at least a part of actual processing by a CPU or the like provided on the function-expanding board or the function-expanding unit based on instructions of the program codes.

When applying the present invention to the above-described storage medium, the storage medium stores program codes corresponding to the above-described flowcharts. Briefly speaking, the modules illustrated in the memory map shown in FIG. 16 or 17 are stored in the storage medium.

Figure 16:
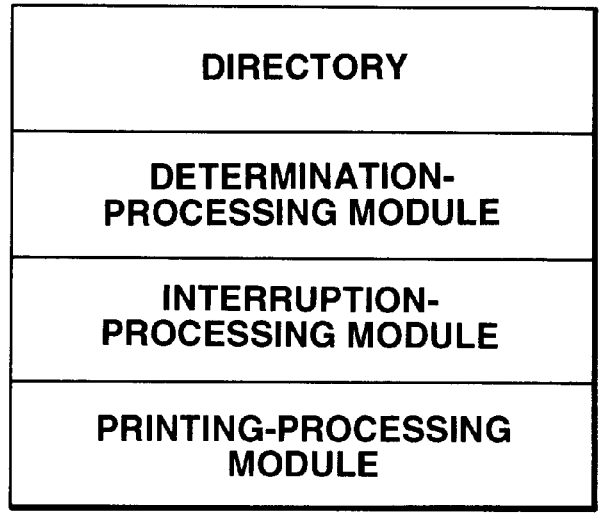
FIGS. 16 and 17 are diagrams each illustrating a memory map in a storage medium for storing control programs.

That is, program codes of at least the "determination-processing module", the "interruption-processing module" and the "printing-processing module" shown in FIG. 16 may be stored in a storage medium for storing control programs to be used in an information processing apparatus including generation means for generating printing information and printing means for printing the printing information generated by the generation means.

The determination-processing module is a program module for determining whether or not printing information has been input from the outside of the information processing apparatus. The interruption-procesing module is a program module for interrupting processing in execution when it has been determined that the printing information has been input from the outside of the apparatus. The printing-processing module is a program module for printing the input printing information by the printing means.

Figure 17:
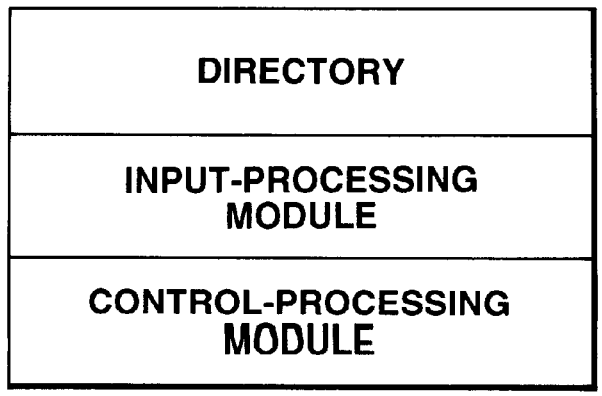

Program codes of at least the "input-processing module" and the "control-processing module" shown in FIG. 17 may be stored in a storage medium for storing control programs to be used in an information processing apparatus including generation means for generating printing information and printing means for printing the printing information generated by the generation means.

The input-processing module is a program module for inputting printing information from the outside of the information processing apparatus. The control-processing module is a program module for controlling whether input printing information is to be transferred to the printing means or to be spooled.

The individual components shown in outline or designated by blocks in the drawings are all well known in the information processing apparatus, information processing method and storage medium arts and their specific construction and operation are not critical to the operation or the best mode for carrying out the invention.

While the present invention has been described with respect what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus comprising:
   generation means for generating first printing information;
   printing means for printing the first printing information;
   output means for outputting the first printing information to the outside of said apparatus;
   input means for inputting second printing information from the outside of said apparatus;
   detection means for detecting that the second printing information has been input from the outside of said apparatus to said input means;
   instruction means for, when said detection means detects that the second printing information has been input from the outside of said apparatus to said input means, prohibiting output of the first printing information to the outside of said apparatus by said output means and instructing transfer of the second printing information to said printing means; and
   a housing containing said generation means, said printing means, said output means, said input means, said detection means, and said instruction means.

2. An apparatus according to claim 1, wherein said input means inputs the second printing information from another information processing apparatus.

3. An apparatus according to claim 1, wherein said output means outputs the first printing information to a printing device connected to said information processing apparatus.

4. An apparatus according to claim 1, wherein said information processing apparatus comprises a word processor incorporating a printer.

5. An apparatus according to claim 1, wherein said information processing apparatus comprises a notebook-size personal computer incorporating a printer.

6. An apparatus according to claim 1, wherein said input means is combined with said output means.

7. An apparatus according to claim 1, wherein said input means is within a control unit for controlling a printing operation by said printing means.

8. An information processing method for use in an information processing apparatus comprising generation means for generating printing information, printing means for printing the printing information generated by the generation means, and a housing containing the generation means and the printing means, said method comprising the steps of:
   determining whether or not printing information has been input from the outside of the information processing apparatus;
   interrupting the generation of printing information when it has been determined in said determining step that printing information has been input from the outside of the apparatus; and sending the input printing information to the printing means while the generation of printing information is interrupted.

9. A method according to claim 8, wherein the information processing apparatus comprises a word processor incorporating a printer which serves as the printing means.

10. A method according to claim 8, wherein the information processing apparatus comprises a notebook-size personal computer incorporating a printer.

11. A storage medium for storing control programs to be used in an information processing apparatus comprising generation means for generating printing information, printing means for printing the printing information generated by the generation means, and a housing containing the generation means and the printing means, said storage medium comprising:

storage means for storing a control program for determining whether or not printing information has been input from the outside of the information processing apparatus, interrupting the generation of printing information when it has been determined that printing information has been input from the outside of the apparatus, and sending the input printing information to the printing means while the generation of printing information is interrupted.

12. A storage medium according to claim 11, wherein the information processing apparatus comprises a word processor incorporating a printer.

13. A storage medium according to claim 11, wherein the information processing apparatus comprises a notebook-size personal computer incorporating a printer.

14. An information processing apparatus comprising:

generation means for generating printing information;

printing means for printing the printing information generated by said generation means;

input means for inputting printing information from the outside of said information processing apparatus;

control means for interrupting the generation of printing information in response to the printing information input into said information processing apparatus through said input means, and for transferring the printing information input through said input means to said printing means, or for spooling the input printing information; and a housing containing said generation means, said printing means, said input means, and said control means.

15. An apparatus according to claim 14, wherein said input means inputs the printing information from another information processing apparatus.

16. An apparatus according to claim 14, wherein said control means spools the input printing information on a hard disk.

17. An apparatus according to claim 14, wherein said information processing apparatus comprises a word processor incorporating a printer.

18. An apparatus according to claim 14, wherein said information processing apparatus comprises a notebook-size personal computer incorporating a printer.

19. An information processing method for use in an information processing apparatus comprising a portable housing containing generation means for generating printing information and printing means for printing the printing information generated by the generation means, said method comprising the steps of:

inputting printing information from the outside of the information processing apparatus;

interrupting the generation of printing information in response to the printing information input in said inputting step; and transferring the printing information input in said inputting step to the printing means or spooling the input printing information.

20. A method according to claim 19, wherein said inputting step inputs the printing information from another information processing apparatus.

21. A method according to claim 19, wherein control means spools the input printing information on a hard disk.

22. A method according to claim 19, wherein the information processing apparatus comprises a word processor incorporating a printer.

23. A method according to claim 19, wherein the information processing apparatus comprises a notebook-size personal computer incorporating a printer.

24. A storage medium for storing control programs to be used in an information processing apparatus comprising a portable housing containing generation means for generating printing information and printing means for printing the printing information generated by the generation means, said storage medium comprising:

storage means storing a control program for inputting printing information from the outside of the information processing apparatus, for interrupting the generation of printing information in response to the input printing information, and for transferring the input printing information to the printing means or spooling the input printing information.

25. A storage medium according to claim 24, wherein the printing information is input from another information processing apparatus.

26. A storage medium according to claim 24, wherein the input printing information is spooled on a hard disk.

27. A storage medium according to claim 24, wherein the information processing apparatus comprises a word processor incorporating a printer.

28. A storage medium according to claim 24, wherein the information processing apparatus comprises a notebook-size personal computer incorporating a printer.

29. An information processing apparatus, comprising:

a printer for printing print data;

interface means for inputting print data from an outside of the information processing apparatus and outputting print data to an outside printer;

determining means for determining whether or not print data has been input from the outside of the information processing apparatus through said interface means;

controlling means for controlling said interface means so that print data is not output to the outside printer when said determining means has determined that print data has been input from the outside of the apparatus, and print data is output to the outside printer only when said determining means has determined that print data has not been input from the outside of the apparatus; and a housing containing said printer, said interface means, said determining means, and said controlling means.

30. An information processing apparatus according to claim 29, wherein said controlling means controls said interface means so that output of print data to the outside printer is interrupted when input of print data from the outside of the information processing apparatus is detected during printing of print data to the outside printer.

31. An information processing apparatus according to claim 29, wherein said information processing apparatus comprises execution means for executing a program, and said controlling means controls said execution means so that a program executed by said execution means is interrupted when input of print data from the outside of the information processing apparatus is detected during execution of the program by said execution means.

32. An information processing apparatus according to claim 29, further comprising a keyboard and a display.

33. An information processing apparatus according to claim 29, wherein said information processing apparatus is a notebook-size personal computer.

34. An information processing method for use in an information processing apparatus in which a computer for generating printing data, a printer for printing data, and an interface means for inputting printing data from an outside of the apparatus and outputting printing data to an outside printer, are contained in one housing, said method comprising the steps of:

determining whether or not printing data has been input from the outside of the information processing apparatus through said interface means; and controlling said interface means so that print data is not output to the outside printer when said determining step has determined that print data has been input from the outside of the apparatus, and print data is output to the outside printer only when said determining step has determined that print data has not been input from the outside of the apparatus.

35. An information processing method according to claim 34, wherein in said controlling step, said interface means is controlled so that output of print data to the outside printer is interrupted when said determining step has determined that print data has been input from the outside of the apparatus during printing of print data to the outside printer.

36. An information processing method according to claim 34, wherein said information processing apparatus comprises execution means for executing a program, and in said controlling step, said execution means is controlled so that the program executed by said execution means is interrupted when input of print data from the outside of the information processing apparatus is detected during execution of the program by said execution means.

37. A storage medium for storing control programs to be used in an information processing apparatus in which a computer for generating printing data, a printer for printing data, and an interface means for inputting printing data from an outside of the apparatus and outputting printing data to an outside printer are contained in one housing, said storage medium comprising:

storage means storing a control program for determining whether or not printing data has been input from the outside of the information processing apparatus through the interface means, and for controlling the interface means so that print data is not output to the outside printer when it has been determined that print data has been input from the outside of the apparatus, and print data is output to the outside printer only when it has been determined that print data has not been input from the outside of the apparatus.

38. A storage medium according to claim 37, wherein said control program controls the interface means so that output of print data to the outside printer is interrupted when it has been determined that print data has been input from the outside of the apparatus during printing of print data to the outside printer.

39. A storage medium according to claim 37, wherein the information processing apparatus comprises execution means for executing a program, and wherein said control program controls the execution means so that the program executed by the execution means is interrupted when input of print data from the outside of the information processing apparatus is detected during execution of the program by the execution means.

* * * * *